(12) United States Patent
Zhang et al.

(10) Patent No.: US 10,299,152 B2
(45) Date of Patent: May 21, 2019

(54) SERVICE PERFORMANCE FEEDBACK IN A RADIO ACCESS NETWORK

(75) Inventors: Yi Zhang, Beijing (CN); Benoist Pierre Sebire, Tokyo (JP)

(73) Assignee: Nokia Solutions and Networks Oy, Espoo (FI)

(*) Notice: Subject to any disclaimer, the term of this patent is extended or adjusted under 35 U.S.C. 154(b) by 0 days.

(21) Appl. No.: 14/400,009

(22) PCT Filed: May 10, 2012

(86) PCT No.: PCT/EP2012/058691
§ 371 (c)(1),
(2), (4) Date: Jan. 9, 2015

(87) PCT Pub. No.: WO2013/167192
PCT Pub. Date: Nov. 14, 2013

(65) Prior Publication Data
US 2015/0156658 A1    Jun. 4, 2015

(51) Int. Cl.
*H04W 40/00* (2009.01)
*H04W 24/10* (2009.01)
*H04L 1/00* (2006.01)
*H04W 4/06* (2009.01)
*H04W 76/40* (2018.01)

(52) U.S. Cl.
CPC ............ *H04W 24/10* (2013.01); *H04L 1/0026* (2013.01); *H04W 4/06* (2013.01); *H04L 2001/0093* (2013.01); *H04W 76/40* (2018.02)

(58) Field of Classification Search
CPC ......... H04L 1/0026; H04L 2001/0093; H04W 76/002; H04W 4/06; H04W 24/10
See application file for complete search history.

(56) References Cited

U.S. PATENT DOCUMENTS

| | | | |
|---|---|---|---|
| 8,412,212 B2* | 4/2013 | Kodikara Patabandi | ................. H04W 76/11 455/450 |
| 8,687,607 B2* | 4/2014 | Casaccia | ............... H04L 1/1671 370/338 |
| 8,825,794 B2* | 9/2014 | Kim | ...................... H04L 12/189 709/217 |

(Continued)

FOREIGN PATENT DOCUMENTS

| | | |
|---|---|---|
| KR | 2009/0029831 A | 3/2009 |
| KR | 2009/0042978 A | 5/2009 |

(Continued)

OTHER PUBLICATIONS

3GPP TSG-RAN WG2 Meeting #61, Sorrento, Italy, Feb. 11-15, 2008, R2-080953, "MBMS feedback configuration", Nokia Siemens Networks, Nokia Corporation, 4 pgs.

(Continued)

*Primary Examiner* — Lan-Huong Truong
(74) *Attorney, Agent, or Firm* — Harrington & Smith

(57) ABSTRACT

A technique, including transmitting from an access node of an access network an instruction to transmit one or more decoding performance reports relating exclusively to a specific type of service, which decoding performance report includes information about the result of one or more attempts to decode at a communication device one or more transmissions via which said specific type of service is provided.

20 Claims, 5 Drawing Sheets

(56) References Cited

U.S. PATENT DOCUMENTS

| | | | |
|---|---|---|---|
| 2004/0229626 A1* | 11/2004 | Yi | H04W 76/02 |
| | | | 455/450 |
| 2008/0008097 A1 | 1/2008 | Avadhanam | |
| 2008/0049749 A1 | 2/2008 | Xiao et al. | |
| 2008/0070606 A1* | 3/2008 | Rikkinen | H04B 7/022 |
| | | | 455/466 |
| 2008/0076359 A1 | 3/2008 | Charpentier et al. | 455/63.1 |
| 2008/0212509 A1* | 9/2008 | Kim et al. | 370/312 |
| 2009/0274050 A1 | 11/2009 | Johansson et al. | |
| 2009/0310501 A1 | 12/2009 | Catovic et al. | |
| 2010/0202371 A1* | 8/2010 | Josiam et al. | 370/329 |
| 2010/0226263 A1* | 9/2010 | Chun | H04L 1/0026 |
| | | | 370/252 |
| 2010/0296454 A1* | 11/2010 | Park et al. | 370/328 |
| 2010/0309836 A1* | 12/2010 | Sugawara | H04W 72/1231 |
| | | | 370/312 |
| 2010/0322132 A1* | 12/2010 | Ramakrishna et al. | 370/312 |
| 2011/0103338 A1* | 5/2011 | Astely et al. | 370/329 |
| 2011/0165881 A1 | 7/2011 | Kodikara Patabandi et al. | |
| 2012/0236776 A1* | 9/2012 | Zhang | H04W 48/12 |
| | | | 370/312 |
| 2012/0281566 A1* | 11/2012 | Pelletier | H04W 76/27 |
| | | | 370/252 |
| 2013/0163444 A1* | 6/2013 | Tee | H04L 69/40 |
| | | | 370/252 |
| 2015/0043514 A1 | 2/2015 | Fischer | |
| 2015/0055539 A1 | 2/2015 | Koskinen et al. | |

FOREIGN PATENT DOCUMENTS

| | | |
|---|---|---|
| KR | 2011/0020298 A | 3/2011 |
| RU | 2393647 C1 | 6/2010 |
| RU | 2427105 C1 | 8/2011 |
| WO | WO 2011/120383 A1 | 10/2011 |

OTHER PUBLICATIONS

TSG-RAN Working Group 5 meeting #32, Edinburgh, Scotland, Aug. 21-25, 2006, R5-062056, "Discussion of issues relating to the performance testing of MBMS", Nokia, 3 pgs.

3GPP TSG-RAN WG5 meeting #50, Taipei, Feb. 21-25, 2011, R5-110882, "Discussion paper on testing of Rel-9 MBMS in LTE", Ericsson, ST-Ericsson, Motorola Mobility, Huawei, 4 pgs.

3GPP TS 36.300 V10.5.0 (Sep. 2011), "3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)", 194 pgs.

RP-111570; Qualcomm Inc.; "Physical Layer Measurements for eMBMS"; 3GPP TSG-RAN #54; Berlin, DE, Dec. 6-9, 2011.

* cited by examiner

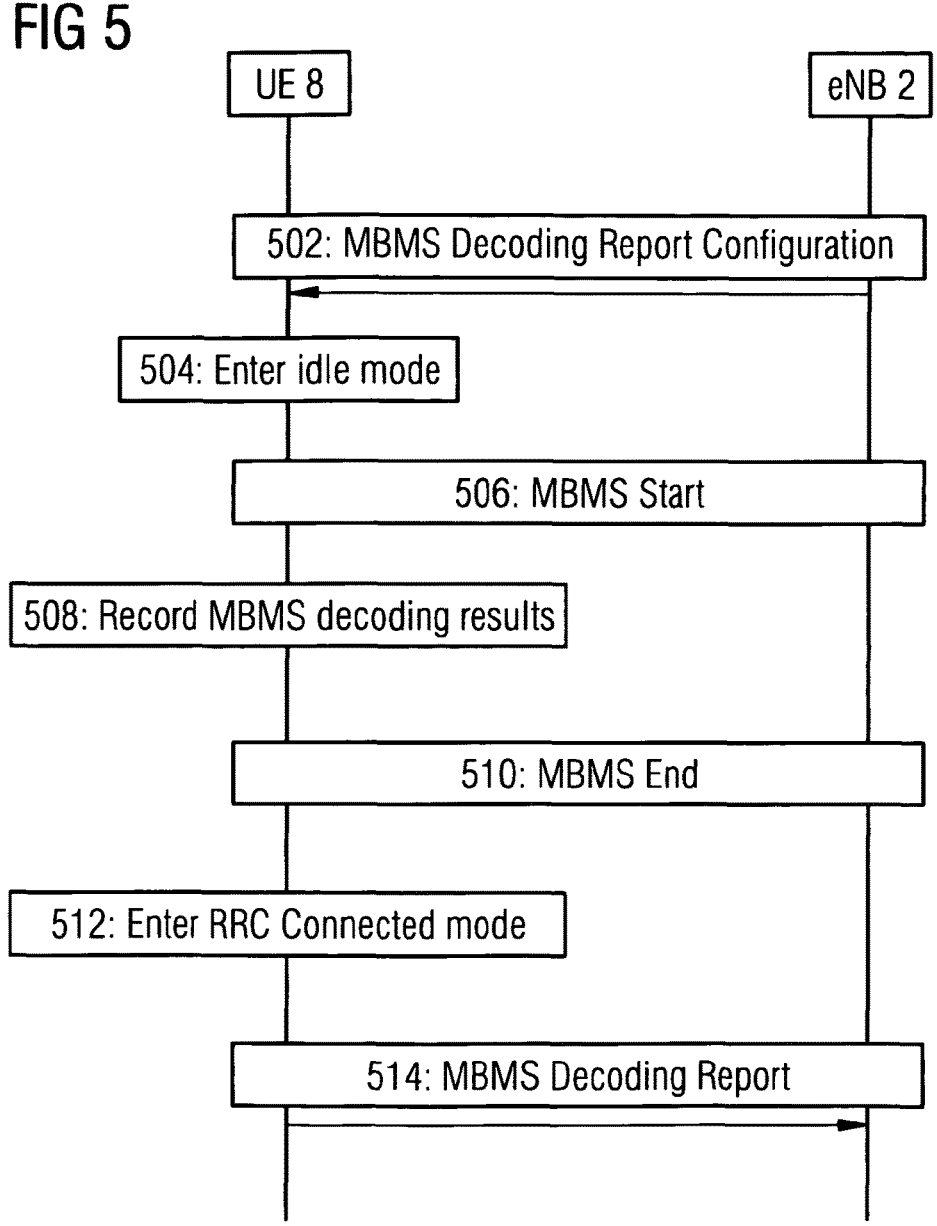

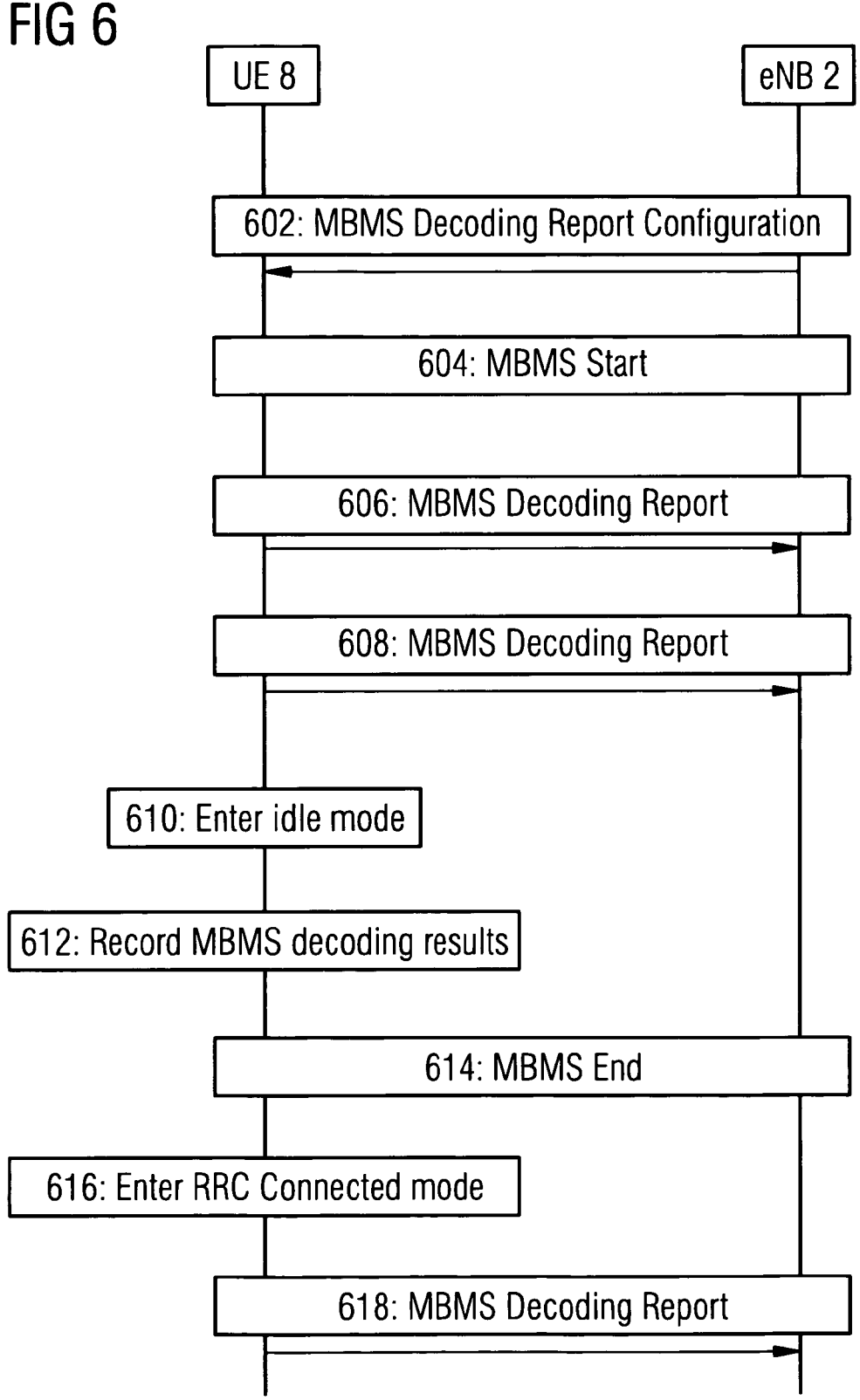

SERVICE PERFORMANCE FEEDBACK IN A RADIO ACCESS NETWORK

The provision of communication services increasingly involves the use of radio access networks.

Some assessment of the performance of a radio link between a communication device and an access node of a radio access network may be derived from the HARQ (Hybrid Automatic Repeat Request) feedback and RLC (Radio Link Control) status reports used in retransmission mechanisms employed to achieve high data rates.

There has been identified the challenge of assessing the performance of a service provided by a radio access network without relying on the feedback used for retransmission mechanisms.

There is hereby provided a method, comprising: transmitting from an access node of an access network an instruction to transmit one or more decoding performance reports relating exclusively to a specific type of service, which decoding performance report comprises information about the result of one or more attempts to decode at a communication device one or more transmissions via which said specific type of service is provided.

There is also hereby provided a method, comprising: in response to receiving at a communication device an instruction from an access network to transmit one or more decoding performance reports relating exclusively to a specific type of service, transmitting one or more decoding performance reports from said communication device to said access network, which decoding performance report comprises information about the result of one or more attempts to decode at said communication device one or more transmissions via which said specific type of service is provided.

There is also hereby provided an apparatus comprising: a processor and memory including computer program code, wherein the memory and computer program code are configured to, with the processor, cause the apparatus to: transmit from an access node of an access network an instruction to transmit one or more decoding performance reports relating exclusively to a specific type of service, which decoding performance report comprises information about the result of one or more attempts to decode at a communication device one or more transmissions via which said specific type of service is provided.

There is also hereby provided an apparatus comprising: a processor and memory including computer program code, wherein the memory and computer program code are configured to, with the processor, cause the apparatus to: in response to receiving at a communication device an instruction from an access network to transmit one or more decoding performance reports relating exclusively to a specific type of service, transmit one or more decoding performance reports from said communication device to said access network, which decoding performance report comprises information about the result of one or more attempts to decode at said communication device one or more transmissions via which said specific type of service is provided.

There is also hereby provided a computer program product comprising program code means which when loaded into a computer controls the computer to: transmit from an access node of an access network an instruction to transmit one or more decoding performance reports relating exclusively to a specific type of service, which decoding performance report comprises information about the result of one or more attempts to decode at a communication device one or more transmissions via which said specific type of service is provided.

There is also hereby provided a computer program product comprising program code means which when loaded into a computer controls the computer to: in response to receiving at a communication device an instruction from an access network to transmit one or more decoding performance reports relating exclusively to a specific type of service, transmit one or more decoding performance reports from said communication device to said access network, which decoding performance report comprises information about the result of one or more attempts to decode at said communication device one or more transmissions via which said specific type of service is provided.

In one embodiment, said specific type of service is a multimedia broadcast/multicast service.

In one embodiment, said decoding performance report relates exclusively to transmissions for which a common service identifier is specified in associated control signaling.

In one embodiment, said service identifier is a temporary mobile group identifier.

In one embodiment, said decoding performance report comprises information about the rate of loss of transport blocks.

In one embodiment, said decoding performance report comprises information about the rate of loss of radio link control service data units or rate of loss of radio link control packet data units.

In one embodiment, configuration information for configuring said decoding result report is transmitted from said access node, and said communication device configures said decoding performance report according to the report configuration information received from said access network.

In one embodiment, said configuration information specifies reporting an average result over a specified duration of a plurality of attempts to decode transmissions relating to said specific type of service.

In one embodiment, said specified duration comprises one of the following: the entire duration of a session of the specific type of service; a length of time decided by the access network; a length of time that the communication device remains in one or more cells specified by the access network.

In one embodiment, said communication device attempts to decode transmissions relating to said specific type of service in a plurality of cells of said radio access network, and said configuration information specifies reporting a plurality of respective average results over said specified duration for each of said plurality of cells.

In one embodiment, said configuration information specifies selectively reporting the result of one or more decoding attempts at periodic intervals.

In one embodiment, said configuration information specifies reporting only decoding attempt results that meet predetermined criteria.

Embodiments of the present invention are described in detail hereunder, by way of example only, with reference to the accompanying drawings, in which:

FIGS. 4 to 6 illustrate three different examples of operation sequences at UE and eNB according to an embodiment of the present invention.

Embodiments of the invention are described in detail below, by way of example only, in the context of a cellular network capable of operating in accordance with the 3GPP Long Term Evolution (LTE) standard, which was first specified in the Release 8 document series of the 3rd Generation Partnership Project (3GPP), and enhancements of which are specified in the Release 9 and 10 document series.

Furthermore, embodiment of the inventions are described below for the example of a multimedia broadcast/multicast service (MBMS), but the same techniques are also applicable to other services provided by a cellular network, particularly other services that involve downlink transmissions without any uplink HARQ feedback or RLC status reports.

A multimedia broadcast service involves making data transmissions that can be decoded by any network subscriber in the transmission coverage area. A multimedia multicast service also involves making transmissions that can be decoded by a plurality of users in the transmission coverage area, but only those users that have subscribed to the service and have joined the multicast group associated with the service. Both are unidirectional services; they do not involve the uplink transmission of HARQ feedback or RLC status reports.

Examples of multimedia content are text, audio, picture and video.

Figure 1:
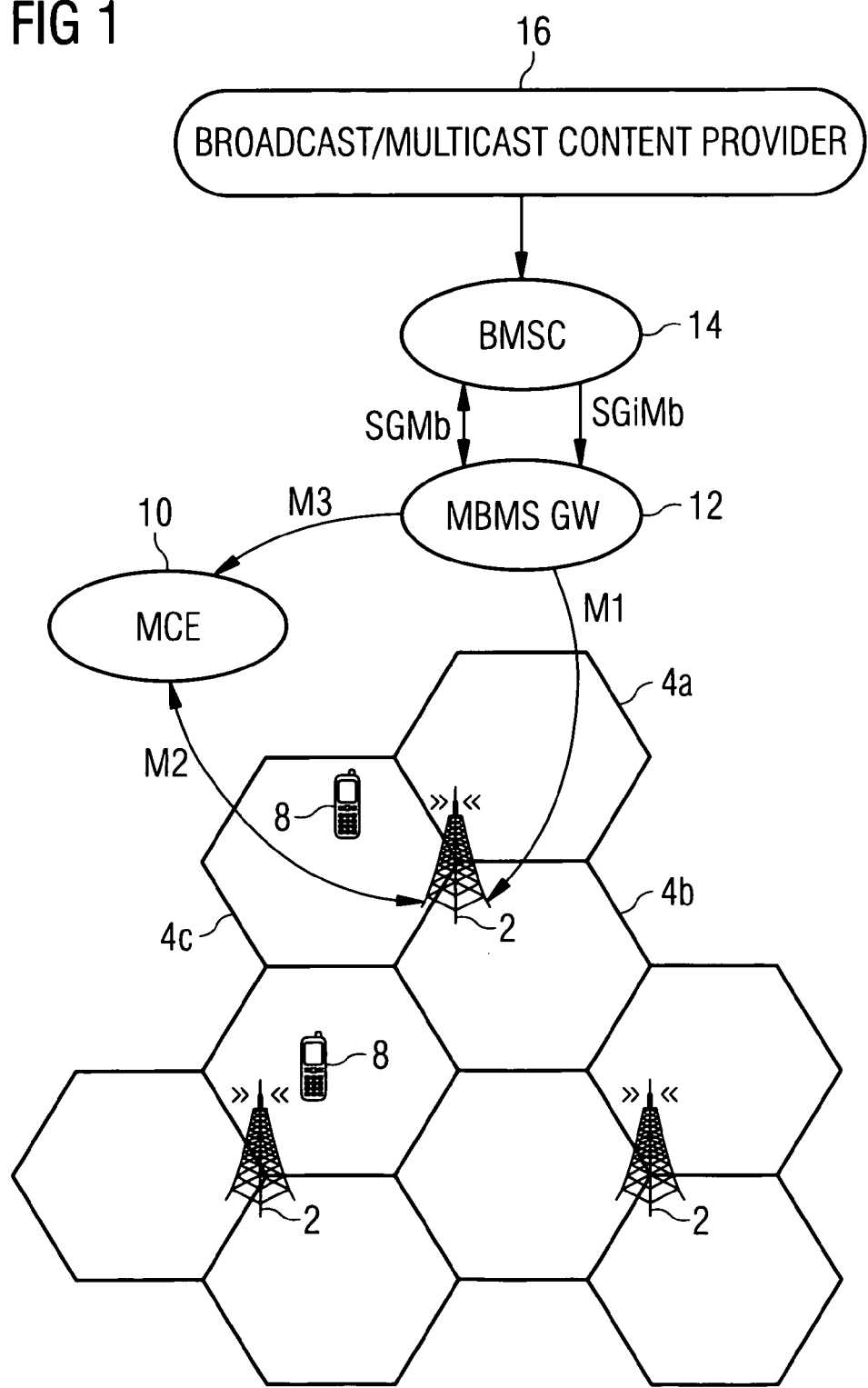
FIG. 1 illustrates an example of a cellular network in which an embodiment of the present invention is implemented.

FIG. 1 illustrates an example of a system for providing MBMS to a communication device via a cellular network. The cellular network comprises an array of eNodeBs (eNBs) 2 having overlapping coverage areas (cells) 4. Only three eNBs 2 and nine cells 4 are shown in FIG. 1, but a mobile telecommunication network will typically comprise tens of thousands of cells and a correspondingly large number of eNBs.

Each eNB 2 is connected to a serving gateway (not shown) which routes and forwards user data packets, and functions as a mobility anchor during handovers between cells of different eNBs. The serving gateway is connected to a packet data network gateway (not shown), which provides connectivity to external data packet networks.

For the provision of MBMS, each eNB 2 is also connected to a MBMS gateway 12 (only one such connection is shown in FIG. 1, but all eNBs 2 are similarly connected to the MBMS gateway 12). The MBMS GW 12 is itself connected to a Broadcast/Multicast Service Centre (BM-SC) 14, and the BM-SC 14 can receive content from external content providers 16. The connections between the MBMS gateway 12 and the eNBs 2 are used to provide M1 user-plane links of the kind defined at Section 15.1 of 3GPP TS36.300 V10.5.0.

FIG. 1 also illustrates the control plane links (M2 and M3 links also defined at Section 15.1 of 3GPP TS36.300 V10.5.0) between the eNBs 2 and a Multi-cell/multicast coordination entity (MCE) 10, and between the MCE 10 and the MBMS GW 12.

The MCE 10 functions to allocate radio resources (time-frequency resources) for multi-cell MBMS transmissions, and performs scheduling for the radio interface between the eNBs 2 and UEs 8. The MCE 10 can be integrated as part of an eNB, in which case the M2 link is an internal eNB link. The MBMS-GW 12 is the point of entry for multicast/broadcast data packets. It functions to broadcast the data packets to all eNBs 2. MBMS GW 12 is also responsible for MBMS session management, such as deciding the start and stop times for a MBMS session. The BMSC 14 controls provision of the MBMS service to the end user. The SGmb interface between the BMSC and MBMS GW is a control interface that supports MBMS bearer signaling for setting up and releasing context when establishing and terminating a MBMS session. The SGi-mb interface supports the MBMS user plane.

Figure 2:
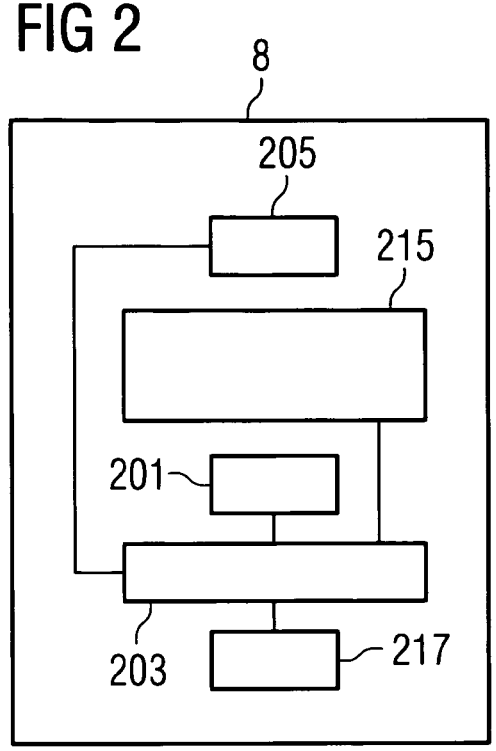
FIG. 2 illustrates an example of apparatus for use at user equipment in FIG. 1.

FIG. 2 shows a schematic view of an example of user equipment 8 that may be used for communicating with the eNBs 2 of FIG. 1 via a wireless interface. The user equipment (UE) 8 may be used for various tasks such as making and receiving phone calls, for receiving and sending data from and to a data network and for experiencing, for example, multimedia or other content.

The UE 8 may be any device capable of at least sending or receiving radio signals to or from the eNBs 2 of FIG. 1. Non-limiting examples include a mobile station (MS), a portable computer provided with a wireless interface card or other wireless interface facility, personal data assistant (PDA) provided with wireless communication capabilities, or any combinations of these or the like. The UE 8 may communicate via an appropriate radio interface arrangement 205 of the UE 8. The interface arrangement may be provided for example by means of a radio part and associated antenna arrangement. The antenna arrangement may be arranged internally or externally to the UE 8.

The UE 8 may be provided with at least one data processing entity 203 and at least one memory or data storage entity 217 for use in tasks it is designed to perform. The data processor 213 and memory 217 may be provided on an appropriate circuit board and/or in chipsets.

The user may control the operation of the UE 8 by means of a suitable user interface such as key pad 201, voice commands, touch sensitive screen or pad, combinations thereof or the like. A display 215, a speaker and a microphone may also be provided. Furthermore, the UE 8 may comprise appropriate connectors (either wired or wireless) to other devices and/or for connecting external accessories, for example hands-free equipment, thereto.

Figure 3:
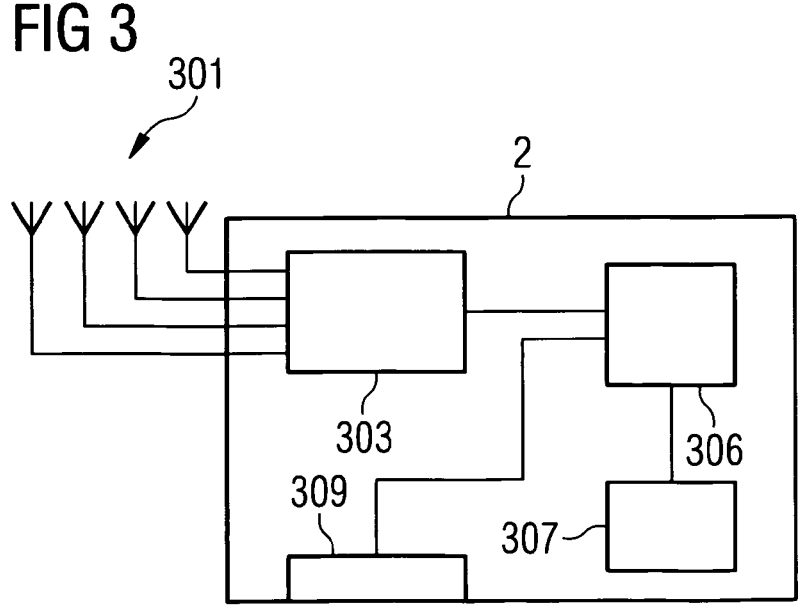
FIG. 3 illustrates an example of apparatus for use at eNodeBs in FIG. 1.

FIG. 3 shows an example of apparatus for use at the eNBs 2 of FIG. 1 and for serving the cell 4 in which UE 8 is located. The apparatus comprises a radio frequency antenna array 301 configured to receive and transmit radio frequency signals; radio frequency interface circuitry 303 configured to interface the radio frequency signals received and transmitted by the antenna 301 and the data processor 306. The radio frequency interface circuitry 303 may also be known as a transceiver. The apparatus also comprises an interface 309 via which, for example, it can communicate with MCE 10 and MBMS-GW 12. The data processor 306 is configured to process signals from the radio frequency interface circuitry 303, control the radio frequency interface circuitry 303 to generate suitable RF signals to communicate information to the UE 6 via the wireless communications link, and also to exchange information with other network nodes via the interface 309. The memory 307 is used for storing data, parameters and instructions for use by the data processor 306.

It would be appreciated that the apparatus shown in each of FIGS. 2 and 3 described above may comprise further elements which are not directly involved with the embodiments of the invention described hereafter.

Figure 4:
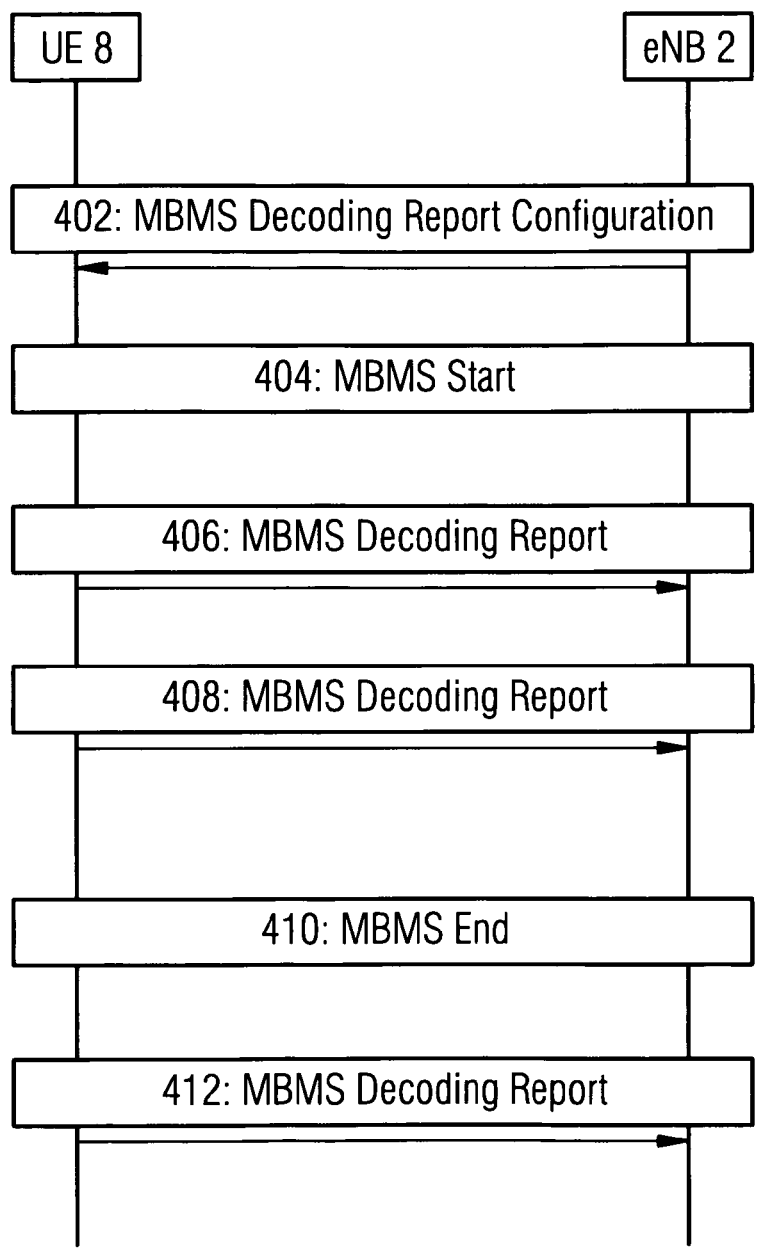

FIGS. 4 to 6 illustrate different sequences of operations at eNB 2 and UE 8 in accordance with an embodiment of the invention.

In each of FIGS. 4 to 6, eNB 2 transmits a configuration message to one or more UEs 2 in one of the eNB's three cells 4a, 4b, 4c. This configuration message could, for example, take the form of system information broadcast by eNB 2, or it could take the form of one or more dedicated messages to respective selected UEs 8. eNB 2 may, for example, send a dedicated configuration message to only one or more UEs 8 that it knows from location information to be in a region for which the network desires information about system performance.

The one or more UEs recognize the configuration message as a request to report quality-of-service (QoS) information about the results of decoding attempts for each MBMS service that it receives. A MBMS service is identified by a temporary mobile group identifier included in the control channel (MBMS point-to-multipoint Control CHannel (MCCH)) associated with the data transmissions for that service.

The above-mentioned configuration message specifies the kind of QoS information that a UE 8 should report to the access network for each MBMS service that it receives. The QoS information for a MBMS could comprise information about the Transport Block loss rate (BLER at HARQ level) for that service, and/or information about the RLC SDU (service data unit) loss rate or the RLC PDU (packet data unit) loss rate for that service, which loss rate can be assessed from gaps in received sequence numbers.

The above-mentioned configuration message also specifies the format of the report of QoS information to the access network. Examples of formats include: (i) the average value of a QoS parameter (such as BLER or RLC SDU loss rate) over a specified period of time; (ii) a breakdown of the average value of a QoS parameter over a specified period of time into respective average values for each cell that the UE visits during said specified period of time; and (iii) the values of a QoS parameter and respective UE location information at periodic intervals.

The above-mentioned configuration message could specify that the UE 8 should provide one or more QoS reports relating to a MBMS service for one of the following durations: the entire duration of the MBMS session; or only for a period of time decided by the network; or only for the period time that UE 8 receives the MBMS whilst in a particular cell or set of cells specified by the network.

The above-mentioned configuration message could specify that the UE 8 only records and reports incidences of QoS information meeting criteria specified by the network.

FIG. 4 illustrates an example of a sequence of operations for a scenario in which a UE happens to be in a RRC Connected mode when a MBMS session starts and remains in a RRC Connected mode for the entire duration of the MBMS session.

A MBMS session happens to begin (STEP 404) after eNB 2 transmits (STEP 402) to UE 8 the above-mentioned configuration message that UE 8 recognises as a request to report quality-of-service (QoS) information about the results of decoding attempts for each MBMS that it receives. The MBMS session is identified by a TMGI included in the MCCH associated with the data transmissions for the MBMS session.

UE 8 transmits one or more reports to eNB 2 of QoS information for this MBMS (STEPS 406 and 408) in accordance with the instructions included in the above-mentioned configuration message received from eNB 2.

After the MBMS session ends (STEP 410), UE 8 optionally sends a further report of the average value of a QoS parameter for the duration of the MBMS session (STEP 412).

FIG. 5 illustrates an example of a sequence of operations for a scenario in which a UE happens to be in RRC Idle mode when a MBMS session starts and remains in RRC Idle mode for the entire duration of the MBMS session.

UE 8 enters IDLE mode (STEP 504) after receiving (STEP 502) the above-mentioned configuration message that UE 8 recognises as a request to report quality-of-service (QoS) information about the results of decoding attempts for each MBMS that it subsequently receives.

A MBMS session (as identified by a TMGI included in the MCCH associated with the data transmissions for the MBMS session) happens to begin (STEP 506) after UE 8 enters IDLE mode (STEP 504). UE 8 can decode the MBMS transmissions (and thereby present the MBMS session to the user) whilst in IDLE mode, but it cannot send reports of QoS information for that MBMS session when in IDLE mode. However, UE 8 records QoS information about the MBMS session in accordance with the instructions in the above-mentioned configuration message from eNB 2. When UE 8 later happens to next enter a RRC Connected mode (STEP 512) after the end of the MBMS session (STEP 510), eNB 2 fetches (STEP 514) from UE 8 the QoS information for this MBMS recorded (STEP 508) in accordance with the instructions included in the above-mentioned configuration message received from eNB 2.

FIG. 6 illustrates an example of a sequence of operations for a scenario in which a UE happens to be in a RRC Connected mode when a MBMS session starts but switches to IDLE mode before the MBMS session ends.

eNB 2 transmits (STEP 602) the above-mentioned configuration message that UE 2 recognises as a request to report quality-of-service (QoS) information about the results of decoding attempts for each MBMS that it receives. After receiving this configuration message, UE 8 happens to be in a RRC Connected Mode, when a MBMS session happens to begin (STEP 604). This MBMS session is identified by a TMGI included in the MCCH associated with the data transmissions for the MBMS session.

UE 8 transmits one or more reports to eNB 2 of QoS information for this MBMS session (STEPS 606 and 608) in accordance with the instructions included in the above-mentioned configuration message.

Before the MBMS session ends (STEP 614), UE 8 happens to switch to IDLE mode (STEP 610). As mentioned above in relation to FIG. 5, UE 8 can continue to decode the MBMS transmissions (and thereby present the MBMS session to the user) after the switch to IDLE mode, but it cannot send reports of QoS information for that MBMS session when in IDLE mode. UE 8 continues to record QoS information about the MBMS session in accordance with the instructions in the above-mentioned configuration message from eNB 2 (STEP 612). When UE 8 later happens to next enter a RRC Connected mode (STEP 616) after the end of the MBMS session (STEP 614), eNB 2 fetches (STEP 618) from UE 8 the QoS information recorded by UE 8 for this MBMS (STEP 612) in accordance with the instructions included in the above-mentioned configuration message received from eNB 2.

In both FIG. 5 and FIG. 6, the step of fetching QoS information from UE 8 (STEP 514 of FIG. 5 and STEP 618 of FIG. 6) could comprise the following sub-steps: (i) UE 8 first transmits an indicator to eNB 2 to indicate the availability of an MBMS report; (ii) in response to this indicator from UE 8, eNB 2 requests UE 8 to transmit the report; and (iii) in response to this request from eNB 2, UE 8 transmits the report to UE 8.

In each of these three examples, the eNB 2 can use for the configuration message transmitted by eNB 2 the kind of configuration message (e.g. RRCConnectionReconfiguration or LoggedMeasurementConfiguration) described in 3GPP TS 36.331 and 3GPP 37.320 for instructing UEs to provide reports about detected reference signals for the purpose of MDT (Minimization of Drive Tests).

If a connection failure happens whilst UE 8 has QoS information to report for a specific MBMS session, the QoS information could be included in the RLF (Radio Link Failure) message that is already used for other purposes.

Where UE 8 happens to receive one or more further MBMS sessions (each identifiable by respective TGMI in the MCCH) during the reporting period specified in the configuration message from eNB 2, UE 8 could, according to one example, send separate reports for each MBMS session.

The above-described operations may require data processing in the various entities. The data processing may be provided by means of one or more data processors. Similarly various entities described in the above embodiments may be implemented within a single or a plurality of data processing entities and/or data processors. Appropriately adapted computer program code product may be used for implementing the embodiments, when loaded to a computer. The program code product for providing the operation may be stored on and provided by means of a carrier medium such as a carrier disc, card or tape. A possibility is to download the program code product via a data network. Implementation may be provided with appropriate software in a server.

For example the embodiments of the invention may be implemented as a chipset, in other words a series of integrated circuits communicating among each other. The chipset may comprise microprocessors arranged to run code, application specific integrated circuits (ASICs), or programmable digital signal processors for performing the operations described above.

Embodiments of the invention may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

In addition to the modifications explicitly mentioned above, it will be evident to a person skilled in the art that various other modifications of the described embodiment may be made within the scope of the invention.

The invention claimed is:

1. A method, comprising:
receiving in a mobile network from a communication device an indication of availability of a decoding performance report comprising information about results of one or more attempts to decode, while being in idle mode in the mobile network, at the communication device one or more transmissions via which a multimedia broadcast/multicast service is provided; and
transmitting a request causing the communication device to transmit the decoding performance report;
wherein the indication of availability of the decoding performance report is transmitted from the communication device upon next entry of the communication device into connected mode in the mobile network.

2. A method according to claim 1, wherein said decoding performance report relates exclusively to transmissions for which a common service identifier is specified in associated control signalling.

3. A method according to claim 2, wherein said common service identifier is a temporary mobile group identifier.

4. A method according to claim 1, wherein said decoding performance report comprises information about the rate of loss of transport blocks.

5. A method, comprising:
storing in a communication device information about results of one or more attempts to decode, while being in idle mode in a mobile network, at the communication device one or more transmissions via which a multimedia broadcast/multicast service is received;
transmitting from the communication device in the mobile network an indication of availability of a decoding performance report comprising information about the results; and
transmitting from the communication device the decoding performance report in response to a request from an access node of the mobile network;
wherein the indication of availability of the decoding performance report is transmitted upon next entry of the communication device into connected mode in the mobile network.

6. A method according to claim 1, comprising receiving the decoding performance report.

7. A method according to claim 1, wherein the mobile network is an evolved universal terrestrial radio access network.

8. A computer program product comprising a non-transitory computer-readable storage medium bearing computer program code embodied therein for use with a computer, the computer program code comprising code for performing the method of claim 1 or 5.

9. A method according to claim 8, wherein said decoding performance report relates exclusively to transmissions for which a common service identifier is specified in associated control signalling.

10. A method according to claim 9, wherein said common service identifier is a temporary mobile group identifier.

11. A method according to claim 8, wherein said decoding performance report comprises information about the rate of loss of transport blocks.

12. A method according to claim 8, further comprising configuring said decoding performance report according to report configuration information received from the mobile network.

13. A method according to claim 8, wherein the idle mode is a radio resource control idle mode in an evolved universal terrestrial radio access network and the connected mode is a radio resource control connected mode in an evolved universal terrestrial radio access network.

14. An apparatus comprising:
at least one processor; and
at least one memory including computer program code, the at least one memory and the computer program code configured to, with the at least one processor, cause the apparatus to perform at least the following:
receive in a mobile network from a communication device an indication of availability of a decoding performance report comprising information about results of one or more attempts to decode, while being in idle mode in the mobile network, at the communication device one or more transmissions via which a multimedia broadcast/multicast service is provided; and transmit a request causing the communication device to transmit the decoding performance report, wherein the indication of availability of the decoding performance report is transmitted from the communication device upon next entry of the communication device into connected mode in the mobile network.

15. An apparatus according to claim 14, and the at least one memory and the computer program code further configured to, with the at least one processor, cause the apparatus to at least receive the decoding performance report.

16. An apparatus according to claim 14, wherein the mobile network is an evolved universal terrestrial radio access network.

17. An apparatus comprising:

at least one processor; and at least one memory including computer program code, the at least one memory and the computer program code configured to, with the at least one processor, cause the apparatus to perform at least the following:

store information about results of one or more attempts to decode, while being in idle mode in a mobile network, at the apparatus one or more transmissions via which a multimedia broadcast/multicast service is provided;

transmit in the mobile network an indication of availability of a decoding performance report comprising information about the results; and transmit the decoding performance report in response to a request from an access node of the mobile network;

wherein the indication of availability of the decoding performance report is transmitted upon next entry of the apparatus into connected mode in the mobile network.

18. An apparatus according to claim 17, wherein said decoding performance report comprises information about the rate of loss of transport blocks.

19. An apparatus according to claim 17, and the at least one memory and the computer program code further configured to, with the at least one processor, cause the apparatus to at least configure said decoding performance report according to report configuration information received from the mobile network.

20. An apparatus according to claim 17, wherein the idle mode is a radio resource control idle mode in an evolved universal terrestrial radio access network and the connected mode is a radio resource control connected mode in an evolved universal terrestrial radio access network.

* * * * *